United States Patent
Perotti (10) Patent No.: US 8,127,490 B2
(45) Date of Patent: *Mar. 6, 2012

(54) BLOCK USED FOR LANDSCAPE AND RELATED APPLICATIONS

(76) Inventor: Joan M. Perotti, Hamburg, NJ (US)

( * ) Notice: Subject to any disclaimer, the term of this patent is extended or adjusted under 35 U.S.C. 154(b) by 387 days.

This patent is subject to a terminal disclaimer.

(21) Appl. No.: 12/087,658

(22) PCT Filed: Jan. 12, 2007

(86) PCT No.: PCT/US2007/000761
§ 371 (c)(1),
(2), (4) Date: Feb. 12, 2009

(87) PCT Pub. No.: WO2007/084338
PCT Pub. Date: Jul. 26, 2007

(65) Prior Publication Data
US 2009/0217601 A1    Sep. 3, 2009

(51) Int. Cl.
*A01G 1/00*    (2006.01)
*E01C 11/22*    (2006.01)
*E01C 5/00*    (2006.01)
*E02D 27/00*    (2006.01)

(52) U.S. Cl. .......... 47/33; 404/7; 404/8; 404/34; 52/102

(58) Field of Classification Search ........ 47/33; 52/102, 52/578, 610, 589.1; 404/7, 8, 34; 446/124, 446/125
See application file for complete search history.

(56) References Cited

U.S. PATENT DOCUMENTS

| | | | | |
|---|---|---|---|---|
| 2,727,737 A | * | 12/1955 | Dole | 266/138 |
| 3,759,043 A | * | 9/1973 | Tokunaga | 249/102 |
| 4,277,921 A | | 7/1981 | Gianfranco | |
| 4,426,176 A | * | 1/1984 | Terada | 405/285 |
| 4,969,289 A | | 11/1990 | Trifiletti | |
| D315,026 S | | 2/1991 | Castonguay et al. | |
| D322,859 S | | 12/1991 | Wurth et al. | |
| 5,134,817 A | | 8/1992 | Richardt | |
| 5,157,867 A | | 10/1992 | Fritch | |
| 5,414,956 A | | 5/1995 | Kheradpir | |
| D361,853 S | | 8/1995 | Northrop | |
| 5,437,127 A | | 8/1995 | Ha | |
| 5,445,362 A | | 8/1995 | Reppert | |
| 5,452,541 A | | 9/1995 | DeMaio | |
| D363,801 S | | 10/1995 | Nauseda | |
| 5,568,994 A | | 10/1996 | Dawson | |
| D378,857 S | | 4/1997 | Hale | |
| 5,720,128 A | | 2/1998 | Smith et al. | |
| D407,507 S | | 3/1999 | Owens, II et al. | |
| D439,677 S | | 3/2001 | Mattox | |
| D457,973 S | * | 5/2002 | Conde | D25/164 |
| 6,539,684 B1 | * | 4/2003 | Graham | 52/609 |
| 6,591,547 B1 | | 7/2003 | Staten et al. | |
| 6,594,959 B2 | | 7/2003 | Whitson | |
| 2002/0078636 A1 | | 6/2002 | Whitson | |
| 2002/0083657 A1 | | 7/2002 | Mattox et al. | |
| 2002/0112399 A1 | | 8/2002 | Riccobene | |

* cited by examiner

*Primary Examiner* — Monica Williams
(74) *Attorney, Agent, or Firm* — Buchanan Ingersoll & Rooney PC (57) ABSTRACT

A block (30) useful in creating, for example, a landscape edging, a patio framing for a patio is L-shaped and includes a first member (32) and a second member (34). The block (30) is adapted to be arranged in an interlocking or interfitting fashion with other similarly configured blocks (30).

12 Claims, 12 Drawing Sheets

BLOCK USED FOR LANDSCAPE AND RELATED APPLICATIONS

TECHNICAL FIELD

The present invention relates generally to devices used in landscaping and other related applications. More particularly, the invention pertains to devices which can be used for defining a border in a landscape area, a patio, framing for a patio and other applications.

BACKGROUND DISCUSSION

The landscaping of homes and commercial properties typically includes numerous elements such as grass, trees, and sidewalks. The maintenance of defined borders between these different landscape elements presents a problem because many of the elements, such as grass and flowers, are constantly growing and encroach upon other areas of the landscape. For example, when grass is growing adjacent to a sidewalk, the grass often grows over the surface edge of the sidewalk making it unsightly and difficult to cut. Grass planted adjacent to fences or mulched areas may also appear unsightly as it grows into mulched areas or up fences. Grass that grows into other areas is difficult to maintain in that it requires an edging device such as a gasoline-powered edger in addition to the lawnmower conventionally used to cut the grass.

Figure 1:
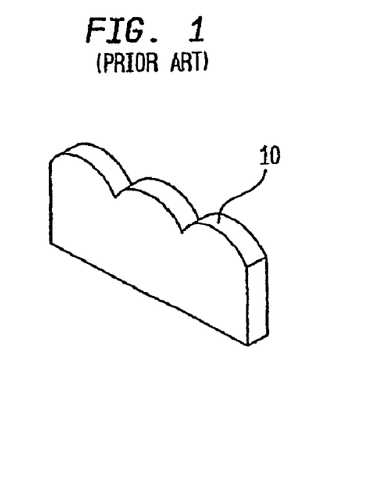
FIG. 1 is a perspective view of a prior art landscaping block commonly known in the art.
Figure 2:
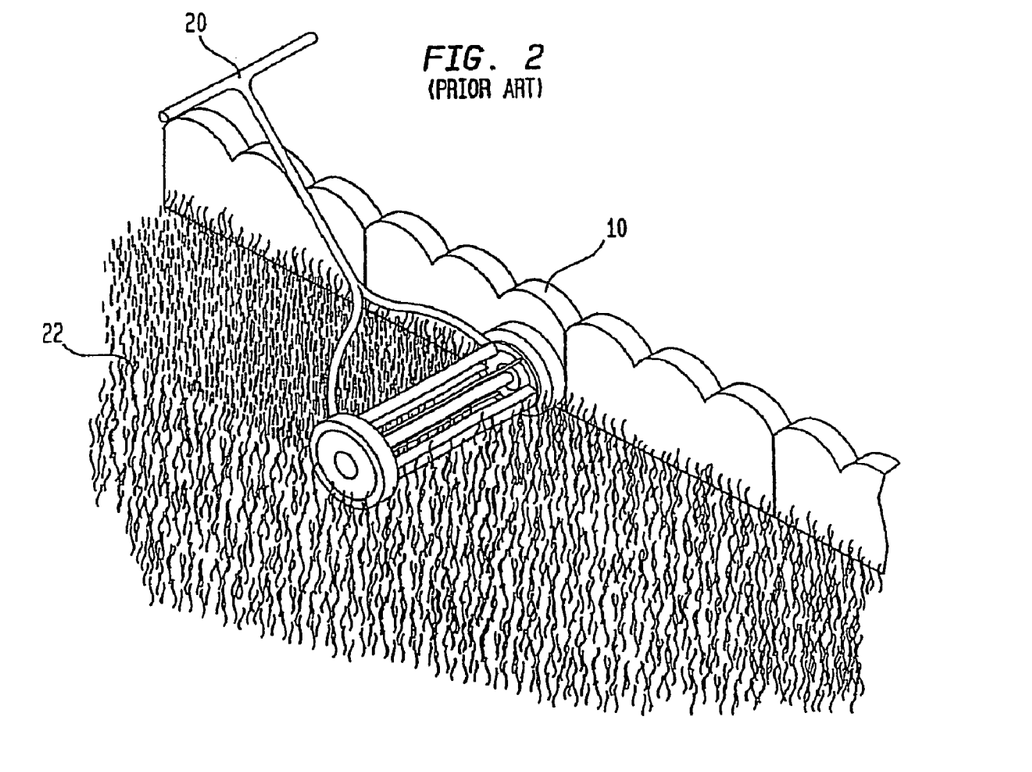
FIG. 2 is view of a plurality of the blocks depicted in FIG. 1 arranged to form a landscape border.

One device known in the art for creating a border between different landscape elements is a scalloped block such as the one shown in FIG. 1. The scalloped edging block 10 shown in FIG. 1 is typically made of concrete and is placed along the border of a lawn to prevent grass from encroaching into an enjoining area. Although this block 10 is successful in preventing grass from growing into adjacent landscape areas, for example preventing grass from growing into a flower bed, this device presents problems for the maintenance of a lawn because grass that grows close to the side of the block 10 cannot be cut with a conventional lawnmower as depicted in FIG. 2. When a lawnmower 20 is operated next to the scalloped block 10, the wheel of the lawnmower 20 will run over the grass 22 growing next to the block 10 and the blade of the lawnmower 20 will not extend far enough towards the block 10 to cut the grass 22 growing immediately adjacent to the block. Thus, another tool such as a landscape edging tool must be used to trim the grass growing adjacent to the block after the lawnmower has passed. This additional landscaping step is tedious and time consuming, especially in large landscaped areas. In addition, the blocks 10 depicted in FIGS. 1-2 tend to fall over if contacted with a lawnmower 20, requiring the landscaper to go back and reset the blocks after mowing the lawn.

Another attempted solution to this problem is shown in U.S. Pat. No. 5,452,541 to DeMaio. DeMaio discloses a plant growth prevention apparatus that provides a barrier between a lawn and a tree. The apparatus taught in DeMaio consists of a number of modules which fit together using connecting rod assemblies. Rods are also used to anchor the apparatus to the ground to prevent it from moving. The object of the apparatus disclosed in the DeMaio is to allow grass to be cut using a traditional lawnmower without the need for an edging device as shown in FIG. 1 of DeMaio. Although the apparatus disclosed in DeMaio prevents grass from growing directly adjacent to trees, the apparatus in DeMaio still presents two problems: the lawnmower operates on a slant to the ground which results in a slanted cut to the grass as depicted in FIG. 1, and the apparatus in DeMaio is difficult to assemble because it requires a plurality of connectors.

Yet another attempted solution to the problem described above is disclosed in U.S. Pat. No. 6,594,959 to Whitson. Whitson discloses a masonry edging block for providing a border to a landscape area. Although the edging block disclosed in Whitson prevents the growth of grass along the border of a landscape area, the assembly in Whitson requires the use of dowels to connect the different blocks that make up the edger assembly. This provides for an awkward and arduous assembly process.

Thus, there remains a need for a device which provides an esthetically pleasing border for landscape areas. There also remains a need for a device that is easy to assemble and that requires minimal maintenance.

SUMMARY

According to one aspect, a landscape block comprises a first member and a second member connected to the first member at a right angle in an L-shaped fashion, wherein the second member is twice as long as the first member.

According to another aspect, An assembly of blocks for use in yard and garden environments comprises a plurality of blocks each comprising a first member and a second member which are arranged relative to one another so that each of the blocks is L-shaped, and the blocks being adapted to be interfitted with one another so that the first member of each block is coplanar with the second member of another block.

According to another aspect, a method of assembling a plurality of blocks in a ground setting comprises positioning a plurality of blocks on the ground, with the blocks comprising a first member and a second member which together form an L-shaped block, and the L-shaped blocks being positioned on the ground so that the first member of at least one of the blocks is coplanar with the second member of another block.

Another aspect involves a landscape border system comprising a plurality of L-shaped blocks having a first section extending in a first plane and a second section extending in a second plane that is substantially perpendicular to the first plane, wherein the first section of each L-shaped block defines a first length and the second section of each L-shaped block defines a second length that is less than the first length. A first one of the L-shaped blocks is positioned on a surface with the longer first section lying on the surface and the shorter second section extending away from the surface, and a second one of the L-shaped blocks is assembled with the first one of the L-shaped blocks so that the shorter second section thereof is positioned on the surface and the longer first section thereof extends away from the surface, wherein the first section of the first one of the L-shaped blocks is aligned with the second section of the second one of the L-shaped blocks and the second section of the first one of the L-shaped blocks is aligned with the first section of the second one of the L-shaped blocks.

DETAILED DESCRIPTION

A preferred embodiment of a landscape edging block according to the present invention will now be described with reference to the figures.

Figure 3:
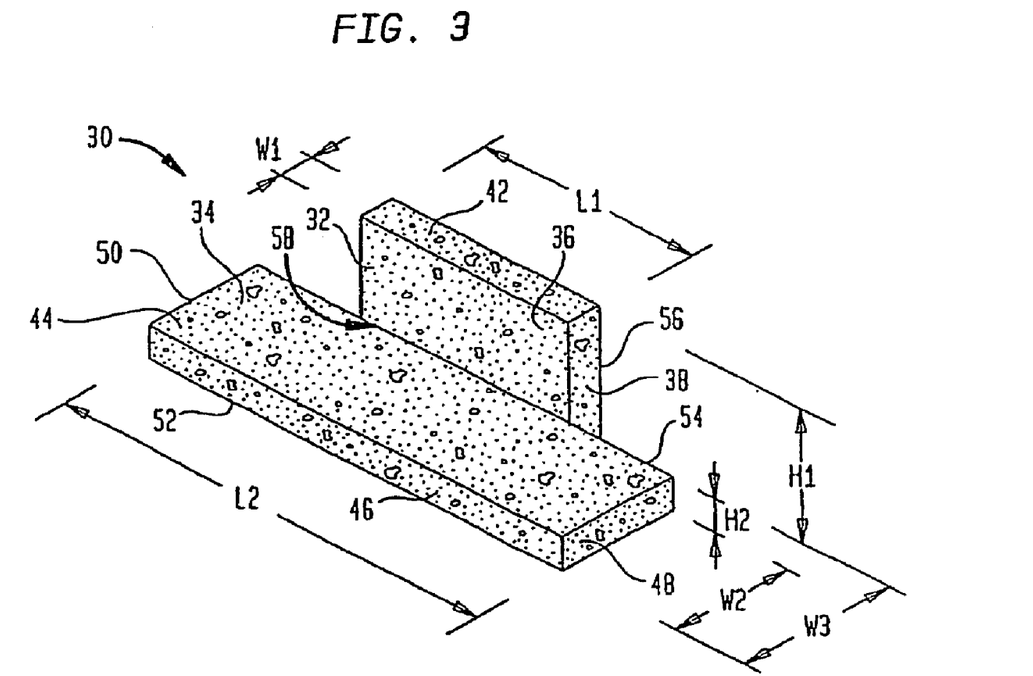
FIG. 3 is a perspective view of one embodiment of a block as disclosed herein.

FIG. 3 depicts a single block 30 according to one embodiment of the present invention. The block comprises a first member 32 and a second member 34 which are preferably integrally formed, but in alternate embodiments the blocks may be assembled at a retail location or by the end user for ease of shipping and storage.

The first member 32 is generally rectangular and has width W1, a height H1, and a length L1. The first member 32 has a front surface 36, a first side surface 38 and a second side surface 40. The first member also has a top surface 42, a bottom surface (not shown), and a rear surface 56.

The second member 34 is also generally rectangular and has a width W2, a height H2, and a length L2. The height H2 of the second member 34 is preferably the same measurement as the width W1 of the first member 32. The total width W3 of the block member 30 is preferably the same measurement as the height H1 of the first member 32. Also, the width W2 of the second member 34 is preferably equal to H1 minus H2. The length L2 of the second member 34 is preferably twice the length L1 of the first member 32. The assembled block 30 has a total width of W3 which is W1+W2. Relative widths, heights, and lengths may vary.

The second member 34 has a top surface 44, a front surface 46, a first side 48 and a second side 50: The second member 34 also has a bottom surface 52 and a rear surface 54. The two blocks are preferably joined at a right angle at 58; the first member 32 being affixed to the rear of the second member 34 in the center of the second member.

In certain preferred embodiments, first member 32 has a length L1 of 8 inches, a width W1 of 3 inches, and a height H1 of 9 inches. In these embodiments, the second member 34 has a length L2 of 16 inches, a width W2 of 6 inches, and a height H2 of 3 inches. The block has a total width W3 of 9 inches. One skilled in the art would recognize that various sizes of landscaping blocks may be made according to the present invention for various different applications. For example, a landscape designer may create interlocking edging blocks according to the invention wherein the second member has a length of only 6 inches for smaller applications such as creating a decorative edge around a flower bed.

Figure 4:
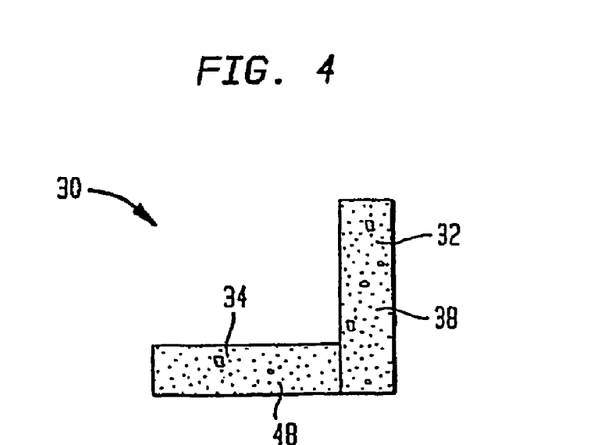
FIG. 4 is a side view of the block depicted in FIG. 3.
Figure 5:
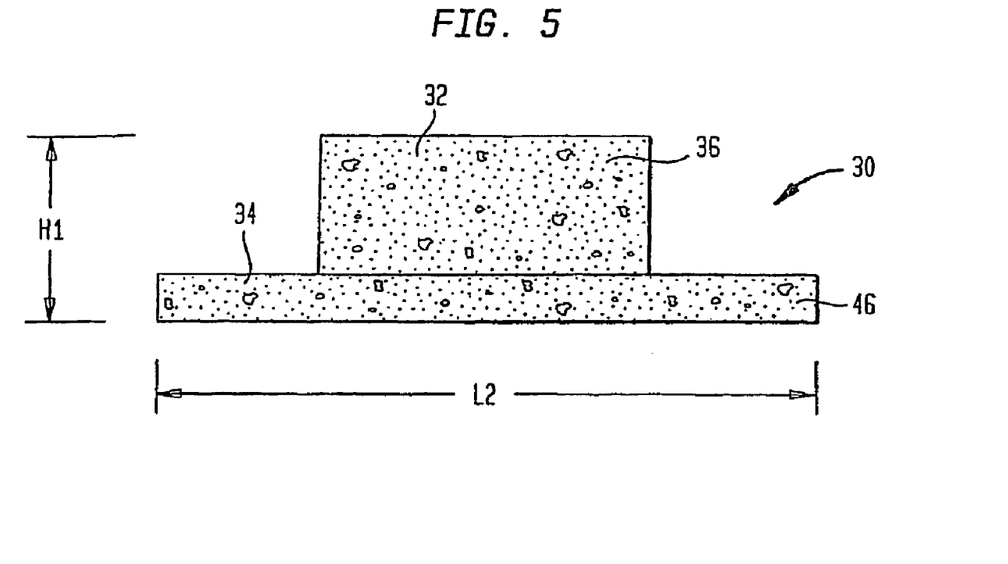
FIG. 5 is a front view of the block depicted in FIG. 3.
Figure 6:
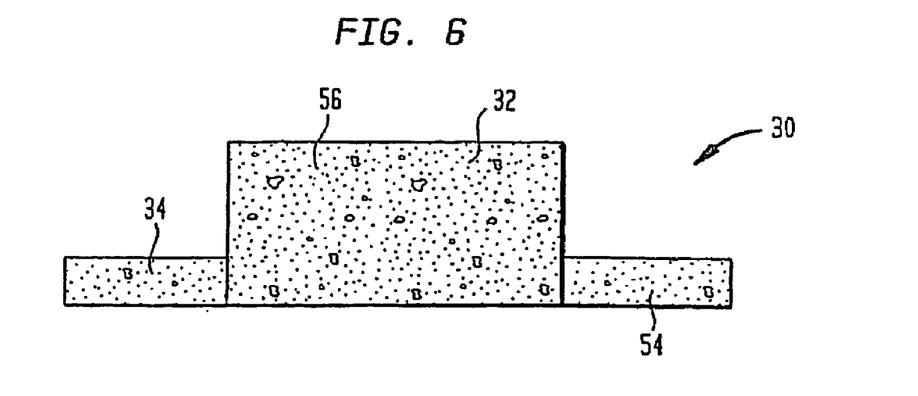
FIG. 6 is a rear view of the block depicted in FIG. 3.
Figure 7:
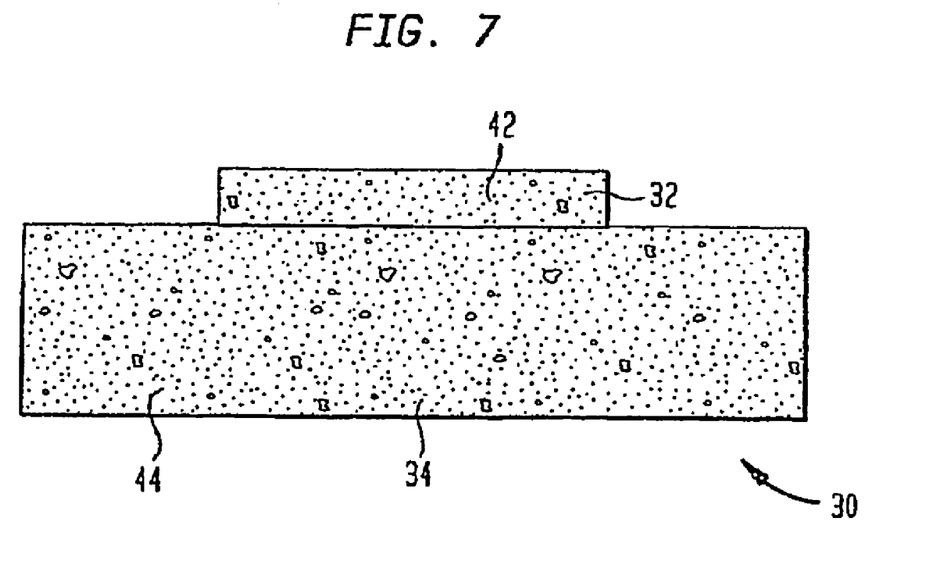
FIG. 7 is a top view of the block depicted in FIG. 3.
Figure 8:
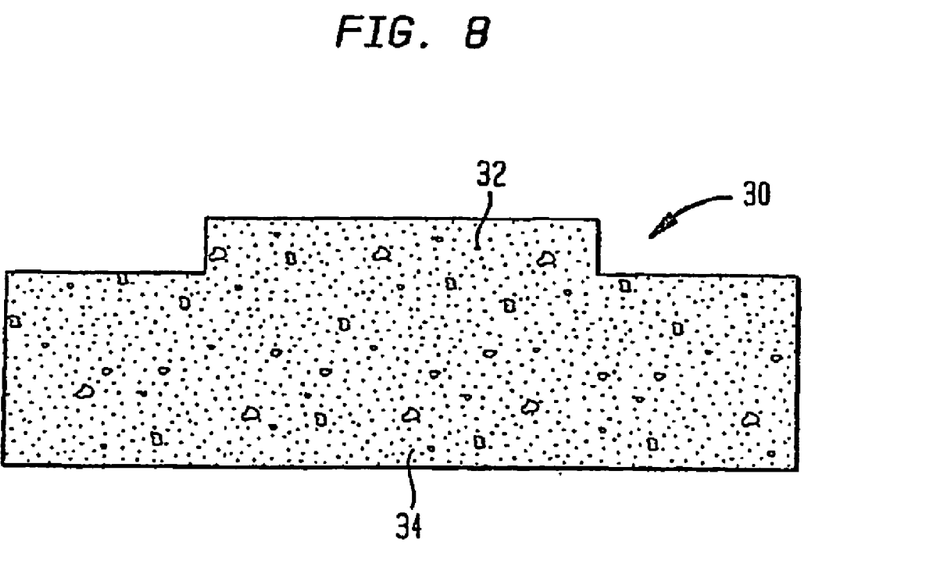
FIG. 8 is a bottom view of the block depicted in FIG. 3.

Other views of the landscape block depicted in FIG. 3 are shown in FIGS. 4-8. FIG. 4 depicts a side view of the block 30. FIG. 5 depicts a front view of the block 30. FIG. 6 depicts a rear view of the block 30. FIG. 7 depicts a top view of a block 30. FIG. 8 depicts a bottom view of the block 30.

Figure 9:
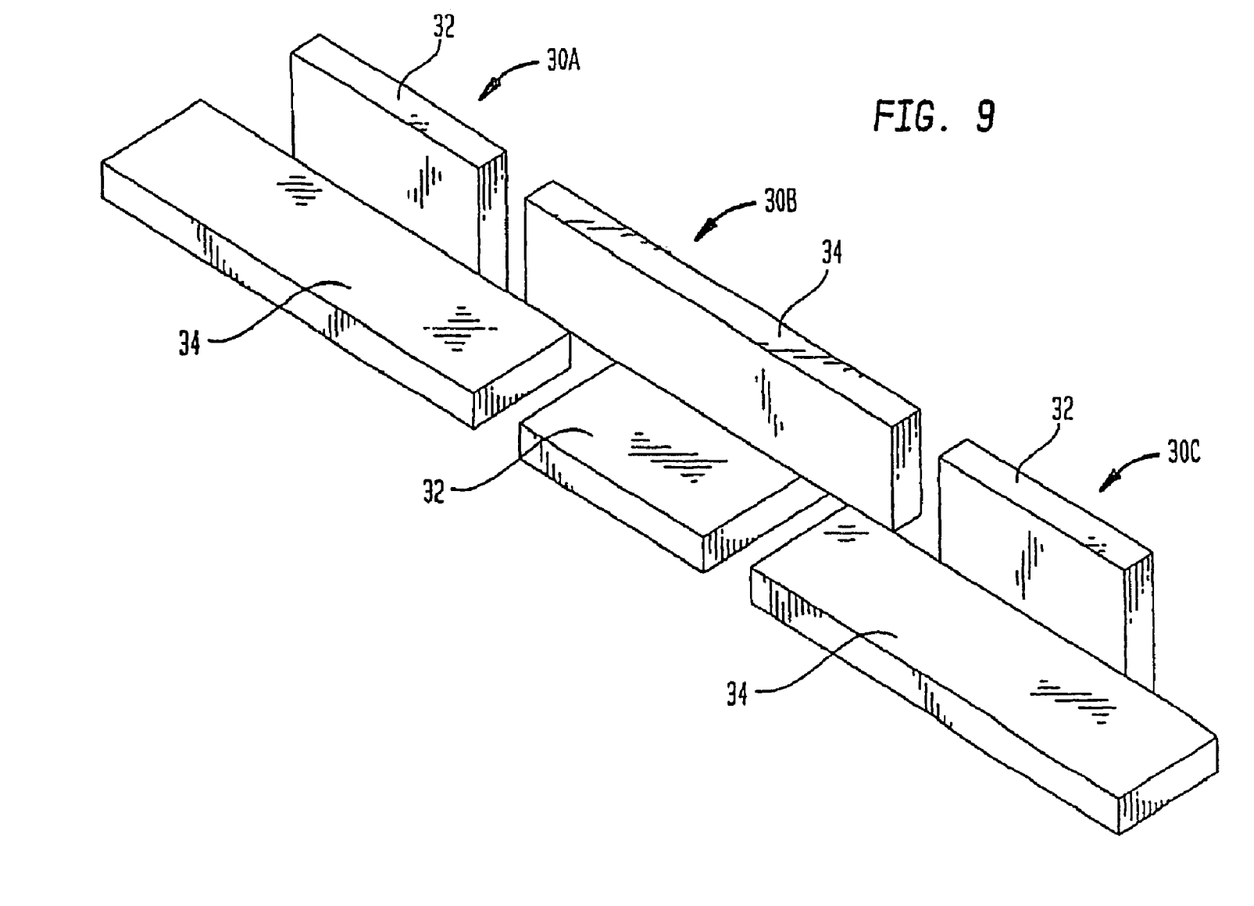
FIG. 9 is perspective exploded view of a plurality of edging blocks according to one embodiment arranged adjacent to each other.
Figure 10:
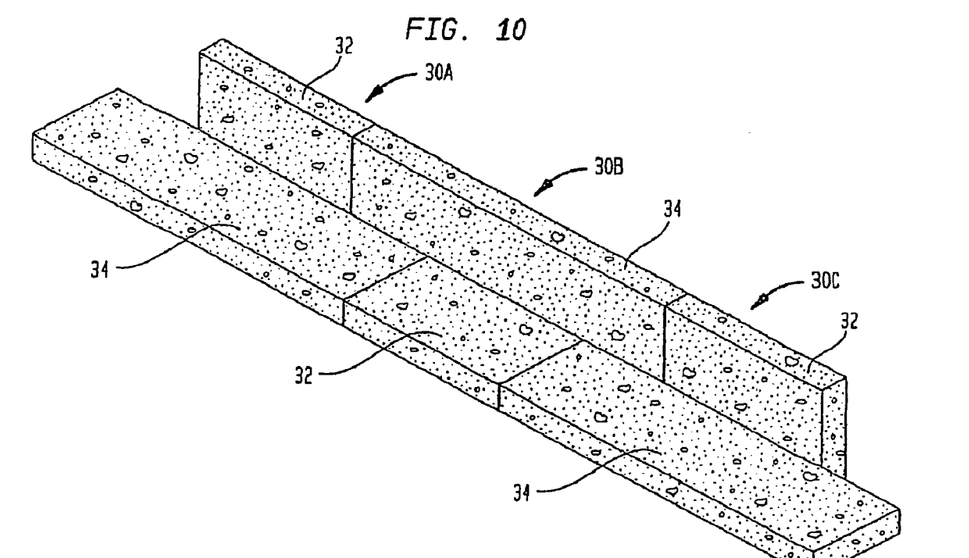
FIG. 10 is a perspective view of a row of blocks according to one embodiment arranged in interfitting fashion to form a landscape border.

Although the block 30 depicted in FIGS. 3-8 is shown with the second member 34 as parallel to the ground, this block may also be positioned such that the first member 32 is positioned on the ground. Using a plurality of these blocks that are all identical, a landscaper may simply rotate half of these blocks such that the first member is on the ground to form the row of blocks depicted in an exploded view in FIG. 9. FIG. 10 depicts three landscape blocks 30A, 30B, and 30C aligned in adjoining fashion in a row to form a landscape border. The blocks 30A, 30B, and 30C interlock with each other to form a barrier to be placed between two areas of landscaping, such as a lawn and a sidewalk. Thus, only a single block design is needed to form the interlocking row depicted in FIGS. 9 and 10. This reduces the costs and burden of purchasing numerous elements for creation of a landscape border. As depicted in FIG. 9, a first landscaping block 30A is arranged with the first member in a vertical orientation and a second member in a horizontal orientation. The second landscaping block 30B is arranged such that the first member is in a horizontal orientation and the second member is in a vertical orientation. The third landscaping block 30C is arranged similarly to the first block 30A: the first member is arranged in a vertical orientation while the second member is arranged in a horizontal orientation. This arrangement creates a uniform border which is aesthetically pleasing. In the arrangement shown in FIG. 10, the first member 32 of each block is coplanar with the second member of another block.

Figure 11:
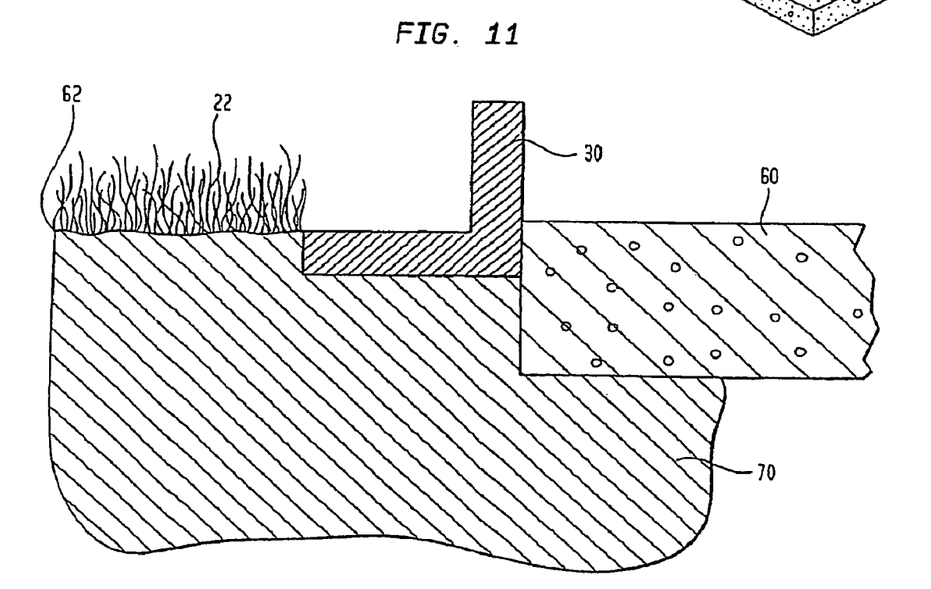
FIG. 11 is a cross-section view of a block according to one embodiment installed between a sidewalk and a grass area.

FIG. 11 depicts a cross-section view of a landscaping block 30 according to the present invention as installed next to a sidewalk 60 in soil 70. The landscaping block 30 is preferably arranged such that the horizontal member of the block 30 is slightly below the soil level 62, allowing grass 22 to grow above the horizontal member of the block 30. This allows a lawnmower to ride along the horizontal member of the block and cut the grass evenly.

Figure 12:
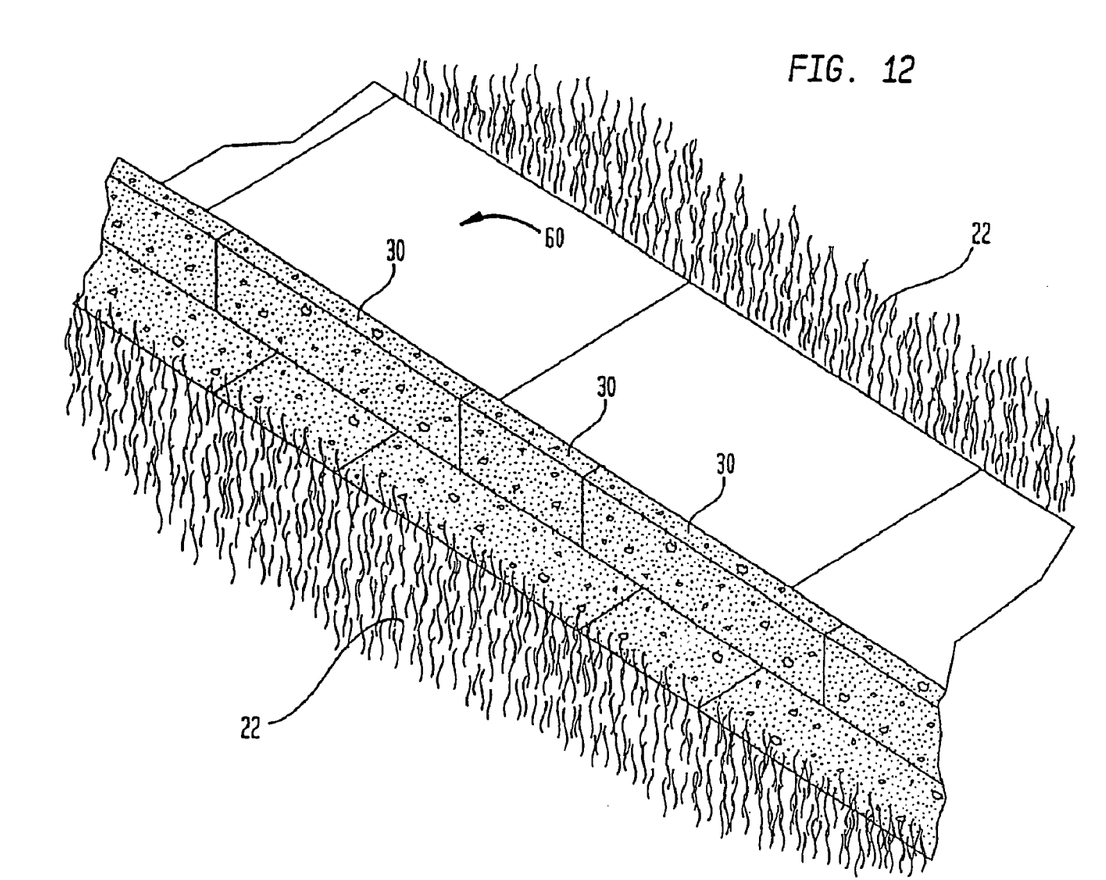
FIG. 12 is a perspective view of a landscape border formed from blocks according to one embodiment arranged between a sidewalk and a grass area to form a landscape border.

FIG. 12 depicts a row of landscaping blocks 30 according to one aspect of the present invention as installed between a sidewalk 60 and a grass area 22. This figure shows how a row of landscaping blocks 30 can be arranged in an interlocking fashion to form a decorative border to a landscaped area.

Figure 13:
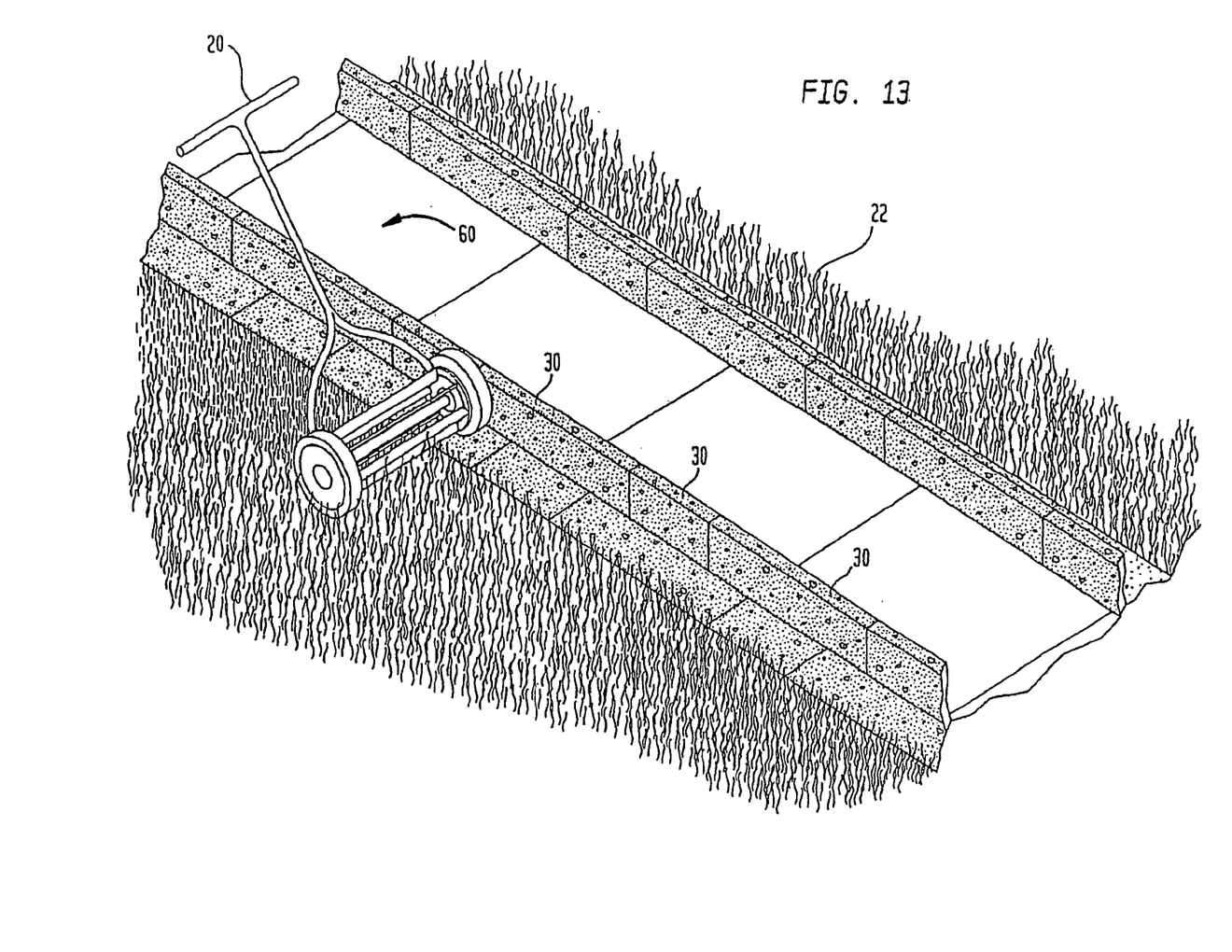
FIG. 13 is a perspective view of two landscape borders formed from blocks according to one embodiment with a lawnmower trimming the grass area adjacent to the border.

FIG. 13 depicts a lawnmower 20 proceeding along the grass area 22 adjacent to a row of landscaping blocks 30 according to the present invention. The lawnmower 20 is able to move with one wheel on the horizontal member of the blocks 30 in order to cut the grass 22 immediately adjacent to the landscaping blocks 30 in a neat and straight manner without leaving any blades of grass next to the blocks. Thus, the result is a well-groomed area of grass without having to move or rearrange and of the blocks and without having to trim next to the blocks with a garden trimmer.

Although the block depicted in FIGS. 3-8 is shown with a coarse surface which may be preferable for use in some landscape applications, one skilled in the art would recognize that certain landscape designers may prefer a block with a smooth surface as depicted in FIG. 9. Some landscape designers may wish to alternate blocks with different textures in the same border for a patterned look. Thus, numerous surfaces may be provided for landscaping blocks according to the present invention.

Landscaping blocks according the present invention may be constructed of concrete, or another type of masonry commonly used for bricks or building materials as known in the art. The blocks are preferably made of a dry cast concrete, but may also be made of wet cast concrete if desired. One skilled in the art would recognize that any material may be used to construct the blocks that is weatherproof, such as plastic or glass.

Figure 14:
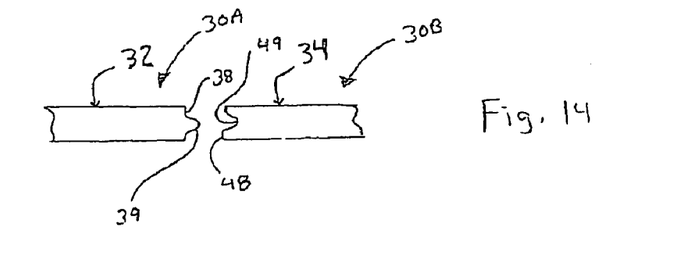
FIG. 14 is a top view of two of the adjacently positioned blocks shown in FIG. 9 illustrating an engagement mechanism on facing side surfaces of the two blocks that provides a more positive engagement of the blocks with one another.

The blocks illustrated in, for example, FIGS. 1 and 9 are shown to have side surfaces (e.g., side surfaces 38, 40, 48, 50) that are smooth. However, it is to be understood that the facing side surfaces of adjacent blocks can be differently configured to provide an interfitting connection between adjacent blocks and thereby provide a more positive engagement between adjacent blocks. By way of example, FIG. 14 illustrates portions of two of the adjacent blocks 30A, 30B shown in FIGS. 9 and 10. The side surface 38 of the vertically oriented first member of the block 30A is provided with a projection 39 while the side surface 48 of the vertically oriented second member 34 of the adjacent block 30B is provided with a recess 49 that receives the projection 39. The projection 39 and correspondingly shaped recess 49 provide an engagement mechanism between adjacent blocks that provides a more positive interengagement between adjacent blocks. Of course, it is to be understood that other types of engagement mechanisms can be employed, for example multiple projections on one side surface that engage corresponding multiple recesses on the facing side surface of the adjacent block, or curved side surfaces on the adjacent blocks that engage one another. In addition, the engagement mechanism can be provided on other side surfaces of the adjacent blocks that face one another and come into contact with each another (e.g., The side surface 38 of the horizontally oriented first member of the block 30A and the side surface 48 of the horizontally oriented second member 34 of the adjacent block 30B).

Figure 15:
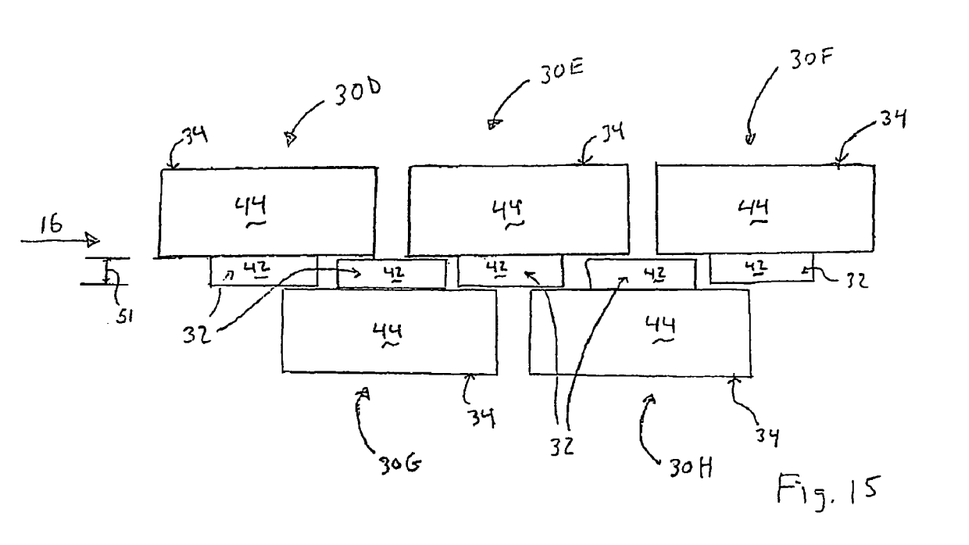
FIG. 15 is a top plan view of several of the blocks arranged to form framing or an edge support structure for a patio.

The block described herein also has useful application in other areas of landscaping or landscaping-related environments involving yard and garden type settings. For example, the interfitting blocks can be arranged to form framing for a patio to provide a patio edge support structure FIG. 15 illustrates an arrangement of interfitting blocks 30D-30H for this purpose. It is to be understood that the illustration in FIG. 15 represents only a portion of the framing. In use, the framing arrangement would extend in the same repeating pattern shown to the extent necessary to accomplish the goal of providing framing for the patio and an edge support structure for the edge of the patio.

As illustrated in FIG. 15, a plurality of the blocks are positioned adjacent one another so that the first member 32 of all of the blocks 30D-30H are arranged vertically in a common plane, with the second member 34 of each successive block extending horizontally in an opposite direction relative to the second member of the immediately adjacent block. Thus, for example, the horizontally arranged second member 34 of the block 30D extends to one side of the plane defined by the vertically arranged first members 32, while the horizontally arranged second member 34 of the immediately adjacent block 30G extends to the opposite side of the plane defined by the vertically arranged first members 32.

In this application, virtually the entire framing (edge support structure) formed by the illustrated arrangement of the blocks is buried in the ground (e.g., soil and/or patio base material). Patio base materials include various known materials used in the industry upon which the patio is placed (e.g., aggregate material). In FIG. 15, the adjacent blocks are depicted as being slightly spaced apart for purposes of facilitating an understanding of the arrangement of the blocks. However, it is to be understood that in use the adjacent blocks would be flush up against one another.

Figure 16:
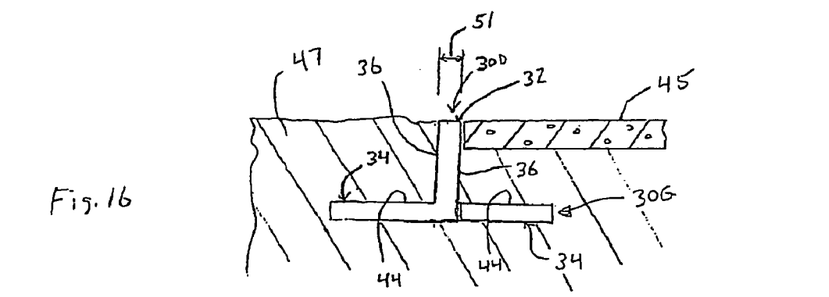
FIG. 16 is a view of the arrangement of blocks shown in FIG. 15 as seen from the direction of arrow 16 in FIG. 15 showing the arrangement of blocks positioned along the edge of a patio and buried in the patio base material.

FIG. 16 shows the framing arrangement shown in FIG. 15 as seen from the direction of the arrow 16 in FIG. 15 illustrating the framing arrangement situated in place in the soil or patio base material 47 at an edge of a patio 45. As illustrated, the top surface of the first member of each block is generally at the same vertical position as the top of the patio 45. Also, the second member 34 of every other block 30G, 30H is positioned under the edge of the patio. By virtue of the arrangement of blocks being buried in the ground, a more stable, and better anchored, framing and support structure for the edge of the patio is provided. After the blocks have been positioned to form the framing for the patio, the patio is installed.

Figure 17:
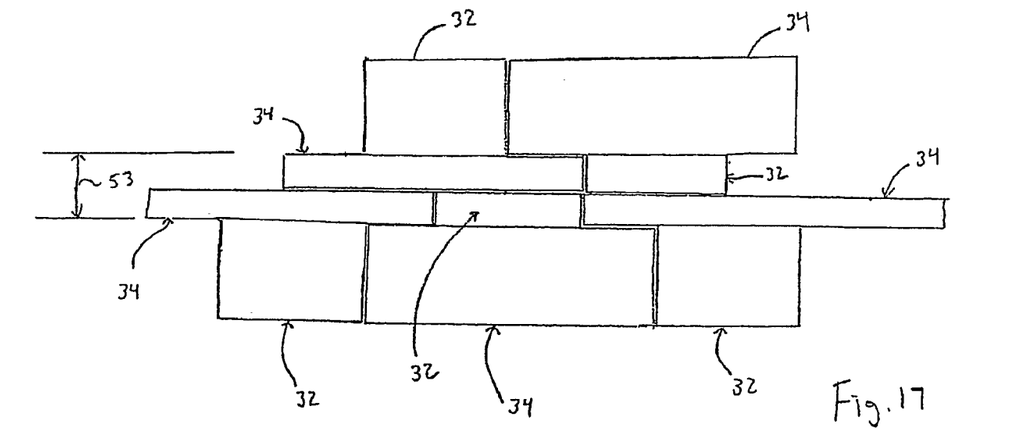
FIG. 17 is a top plan view of several of the blocks arranged to form an alternative version of the patio framing or edge support structure for a patio.

With the arrangement shown in FIGS. 15 and 16, the dimension 51 of the portions of the blocks that are generally flush with the surface of the patio is W1. It is possible to provide an arrangement of blocks for framing a patio in which the dimension of the portions of the blocks that are generally flush with the surface of the patio is 2×W1. This can be accomplished by using an arrangement of five blocks such as shown in FIG. 17. Once again, it is to be understood that the illustration in FIG. 17 represents only a portion of the framing arrangement and that the framing arrangement in actual use would extend beyond that shown in the drawing figure in the same repeating pattern. As can be seen, the framing arrangement shown in FIG. 17 is generally defined by two of the arrangements shown in FIG. 19 arranged in back-to-back relation to one another. The result is a patio framing arrangement in which the dimension 53 of the portions of the blocks that are generally flush with the surface of the patio is 2×W1.

As mentioned above, the specific dimensions for the width, length and height of the first and second members is not limited to those described above, It has been found, for instance, that a particularly useful alternative configuration for the block is one in which the first member 32 is square, having a length L1 of 8 inches, a width W1 of 2 inches, and a height H1 of 8 inches, and the second member is rectangular, having a length L2 of 16 inches, a width W2 of 6 inches, and a height H2 of 2 inches. The total width W3 of the block is thus 8 inches.

Figure 18:
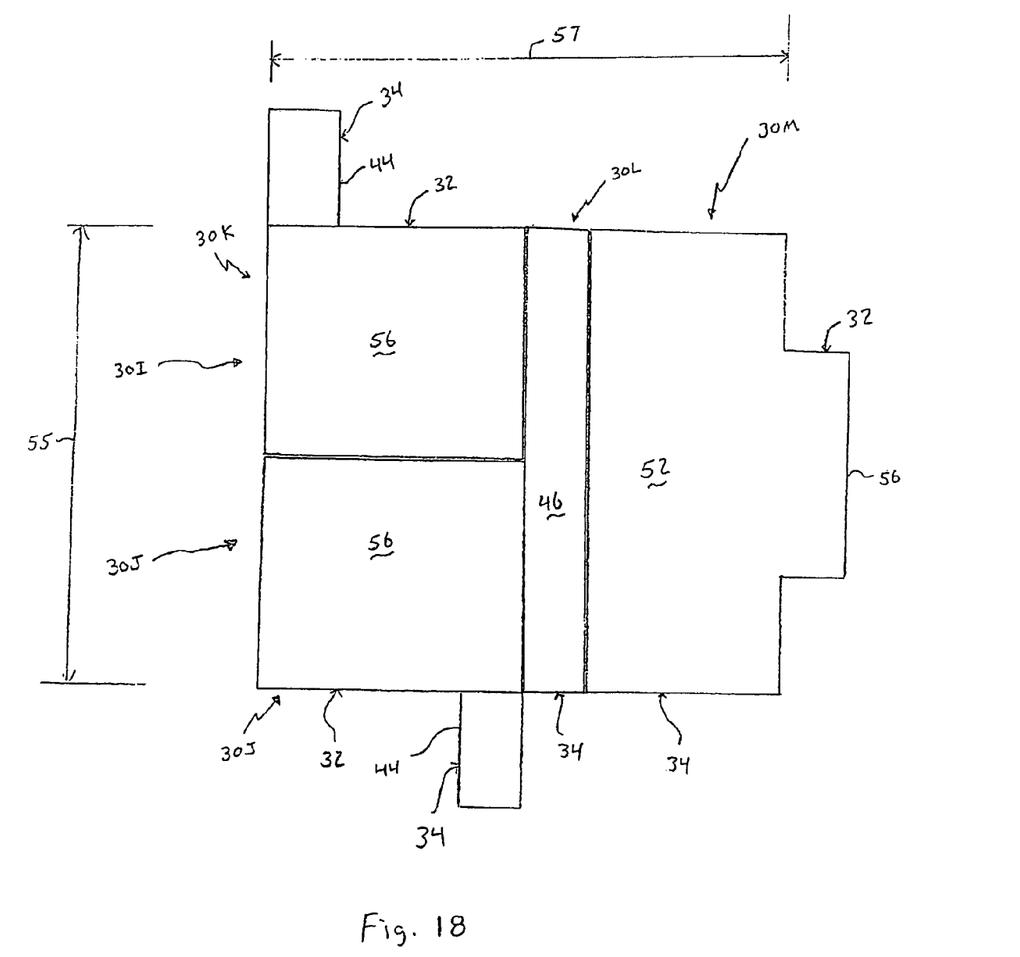
FIG. 18 is a plan view of an arrangement of the blocks forming a part of a patio.

This alternative dimensioning is beneficial from the standpoint of using the blocks to construct a patio. FIG. 18 illustrates one possible arrangement of the blocks forming a portion of a patio. The illustrated arrangement is comprised of four blocks 30J-30M having the dimensions described in the immediately above to form a square shaped patio portion with sixteen inch sides (i.e., the dimensions 55, 57 are each sixteen inches). As can be seen, the flat surface of the patio portion is formed by the rear surfaces 56 of the first members 32 of two blocks 30J, 30K, the front surface 46 of the second member of a third block 30L and the bottom surface 52 of the second member 34 of a fourth block 30M. Each of the blocks 30J-30M has a portion that extends downwardly and, in use, is embedded in the ground (e.g., the soil or patio base material). Thus, the second member 34 of each of the blocks 30J, 30K extends downwardly into the ground, the first member and most of the second member of the block 30L extend downwardly into the ground, and the first member 32 of the block 30M extend downwardly into the ground. This thus anchors the individual blocks forming the patio portion. It is to be understood that the arrangement shown in FIG. 18 can be extended by simply adding additional blocks and orienting them in a way that provides the desired size of patio.

Figure 19:
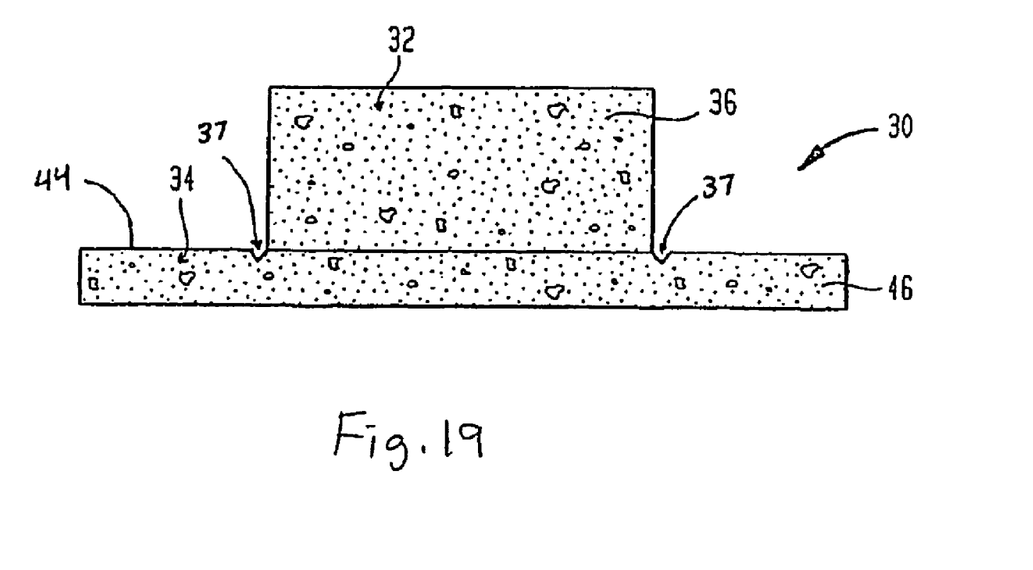
FIG. 19 is a front view of a slightly modified form of the block depicted in FIG. 3.

FIG. 19 illustrates a slightly modified version of the block in which score lines 37 are formed in the top surface 44 of the second member 34. These score lines allow the portions of the second member that extend outwardly beyond the side edges of the first member 32 to be broken off if desired to permit further flexibility in using the blocks for constructing patios or other landscape or landscape-related products. Of course, additional score lines may be provided, or the score lines can be located at different locations to further increase the flexibility in using the blocks.

It is to be seen that in various ones of the disclosed and illustrated versions and uses of the blocks, the blocks are identical to one another and are adapted to be interfitted with one another so that the first member of at least one block is coplanar with the second member of another (an immediately adjoining) block.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

I claim:

1. An assembly of blocks for use in yard and garden environments comprising:
   a plurality of blocks each comprising a first member and a second member which are arranged relative to one another so that each of the blocks is L-shaped, the second member of each block having a length greater than the length of the first member of each block, with the length of the first and second members of each block being measured in the same direction, so that end portions of the second member on opposite ends of the second member in the lengthwise direction extend beyond respective end edges of the first member; and
   the blocks being adapted to be interfitted with one another so that the first member of each of the plurality of blocks is coplanar with the second member of another block.

2. The assembly of blocks of claim 1, wherein the first and second members each possess a width, a height and a length, the height of the first member being equal to the width of the second member plus the width of the first member.

3. The assembly of blocks of claim 1, wherein the first and second members each possess a width, a height and a length, the width of the first member being less than the length and height of the first member, the height of the second member being less than the length and width of the second member, the height of the first member being equal to the width of the second member plus the width of the first member.

4. The assembly of blocks of claim 1, wherein the plurality of blocks are adapted to be arranged so that the first members of one set of blocks are coplanar with the second members of a second set of blocks different from the first set of blocks, and the second members of the first set of blocks are coplanar with the first members of the second set of blocks.

5. The assembly of blocks of claim 1, wherein all of the blocks are identical to one another.

6. The assembly of blocks of claim 1, wherein the length of the second member is twice the length of the first member, the second member of at least some of the blocks being scored to permit a portion of the second member to be separated from a remaining portion of the second member.

7. The landscape block of claim 1, wherein the first member is positioned in the middle of the second member with respect to the lengthwise direction.

8. A method of assembling a plurality of blocks in a ground setting, comprising:
   positioning a plurality of blocks on the ground, the blocks comprising a first member and a second member which together form an L-shaped block, the second member of each of the plurality of blocks having a length greater than the length of the first member of each of the plurality of blocks, with the length of the first and second members of each block being measured in the same direction, so that end portions of the second member on opposite ends of the second member in the lengthwise direction extend beyond respective end edges of the first member; and
   the L-shaped blocks being positioned on the ground so that the first member of at least one of the blocks is coplanar with the second member of another block.

9. The method according to claim 8, wherein the plurality of blocks are positioned on the ground to form a L-shaped landscape edging in which one portion of the edging lies on the ground with an upper surface exposed above the ground and another portion of the L-shaped edging extends upwardly away from the one portion.

10. The method according to claim 8, wherein the plurality of blocks are positioned on the ground to form at least a portion of a patio surface, with the first and second members of at least some of the blocks being embedded in the ground.

11. The method according to claim 8, wherein the plurality of blocks are positioned on the ground to form a framing for a patio which is subsequently installed.

12. A landscape border system comprising:
   a plurality of L-shaped blocks having a first section extending in a first plane and a second section extending in a second plane that is substantially perpendicular to the first plane;
   the first section of each of the L-shaped blocks defining a first length and the second section of each of the L-shaped blocks defining a second length that is less than the first length;
   a first one of the L-shaped blocks being positioned on a surface with the longer first section lying on the surface and the shorter second section extending away from the surface;
   a second one of the L-shaped blocks being assembled with the first one of the L-shaped blocks so that the shorter second section thereof is positioned on the surface and the longer first section thereof extends away from the surface, wherein the first section of the first one of the L-shaped blocks is aligned with the second section of the second one of the L-shaped blocks and the second section of the first one of the L-shaped blocks is aligned with the first section of the second one of the L-shaped blocks.

* * * * *